(12) United States Patent
Bonnin et al.

(10) Patent No.: US 11,454,824 B2
(45) Date of Patent: Sep. 27, 2022

(54) METHOD FOR DETERMINING A PROGRESSIVE OPHTHALMIC DEVICE FOR PERSONALISED VISUAL COMPENSATION FOR AN INDIVIDUAL

(71) Applicant: Essilor International, Charenton-le-Pont (FR)

(72) Inventors: Thierry Bonnin, Charenton-le-Pont (FR); Delphine Tranvouez-Bernardin, Charenton-le-Pont (FR); Laurent Calixte, Charenton-le-Pont (FR); Isabelle Poulain, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 717 days.

(21) Appl. No.: 16/330,011

(22) PCT Filed: Aug. 30, 2017

(86) PCT No.: PCT/FR2017/052309
§ 371 (c)(1),
(2) Date: Mar. 1, 2019

(87) PCT Pub. No.: WO2018/042128
PCT Pub. Date: Mar. 8, 2018

(65) Prior Publication Data
US 2019/0204620 A1  Jul. 4, 2019

(30) Foreign Application Priority Data

Sep. 5, 2016  (FR) ...................... 1658241

(51) Int. Cl.
*G02C 7/02* (2006.01)
*G02C 7/06* (2006.01)
*G02C 7/04* (2006.01)

(52) U.S. Cl.
CPC .............. *G02C 7/027* (2013.01); *G02C 7/061* (2013.01); *G02C 7/047* (2013.01)

(58) Field of Classification Search
CPC ......... G02C 7/027; G02C 7/061; G02C 7/047
(Continued)

(56) References Cited

U.S. PATENT DOCUMENTS

| | | | |
|---|---|---|---|
| 6,199,983 B1* | 3/2001 | Kato | G02C 7/027 351/159.42 |
| 2006/0100613 A1* | 5/2006 | McArdle | A61F 9/008 606/4 |

(Continued)

FOREIGN PATENT DOCUMENTS

| | | |
|---|---|---|
| CN | 101057170 A | 10/2007 |
| CN | 105452942 A | 3/2016 |

(Continued)

OTHER PUBLICATIONS

Combined Chinese Office Action and Search Report dated Nov. 20, 2019 in corresponding Chinese Patent Application No. 201780053954.0 (with English Translation of Category of Cited Documents), 10 pages.

International Search Report dated Dec. 7, 2017 in PCT/FR2017/052309 filed Aug. 30, 2017.

*Primary Examiner* — Marin Pichler
*Assistant Examiner* — Mitchell T Oestreich
(74) *Attorney, Agent, or Firm* — Oblon, McClelland, Maier & Neustadt, L.L.P.

(57) ABSTRACT

The invention relates to a method for determining a progressive ophthalmic device for personalised visual compensation for an individual, according to which the following steps are performed: a) in a first data acquisition phase, determining at least at a first time preceding the appearance of the presbyopia of this individual, at least one value of at least one individual parameter of said individual, and (Continued)

Figure 1:
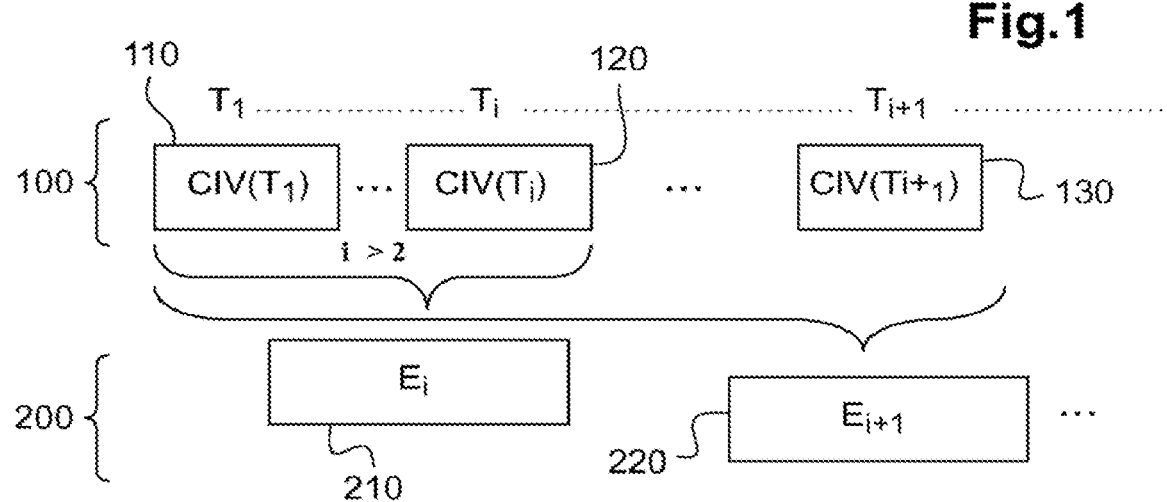

recording each value of the individual parameter of the wearer in a database, in correlation with an associated temporal indicator, b) in a second determination step of the progressive ophthalmic device for personalised visual compensation, determining a desired value of at least one geometric or optical parameter of said progressive ophthalmic device for visual compensation, taking account of said at least one value of the individual parameter determined in step a) and the associated temporal indicator.

13 Claims, 2 Drawing Sheets

(58) Field of Classification Search
USPC .................................................. 351/159.74
See application file for complete search history.

(56) References Cited

U.S. PATENT DOCUMENTS

| 2014/0268060 A1 | 9/2014 | Lee et al. |
| 2015/0309333 A1 | 10/2015 | Uchiyama et al. |
| 2016/0128560 A1 | 5/2016 | Lee et al. |
| 2016/0128567 A1 | 5/2016 | Lee et al. |
| 2016/0161766 A1* | 6/2016 | Archambeau .......... G02C 7/081 351/158 |
| 2016/0178933 A1 | 6/2016 | Archambeau et al. |
| 2017/0188811 A1 | 7/2017 | Lee |

FOREIGN PATENT DOCUMENTS

| EP | 1 959 294 A2 | 8/2008 |
| EP | 2 833 196 A1 | 2/2015 |
| WO | WO 2014/069656 A1 | 5/2014 |

* cited by examiner

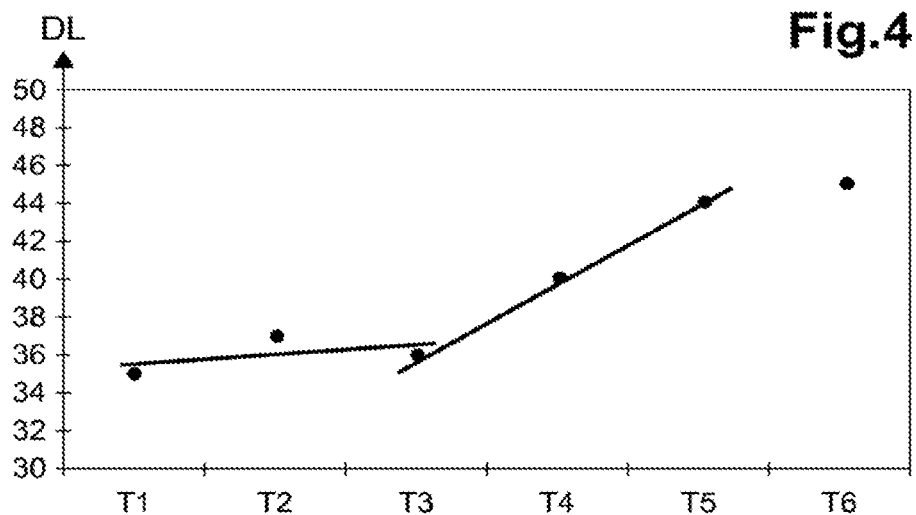
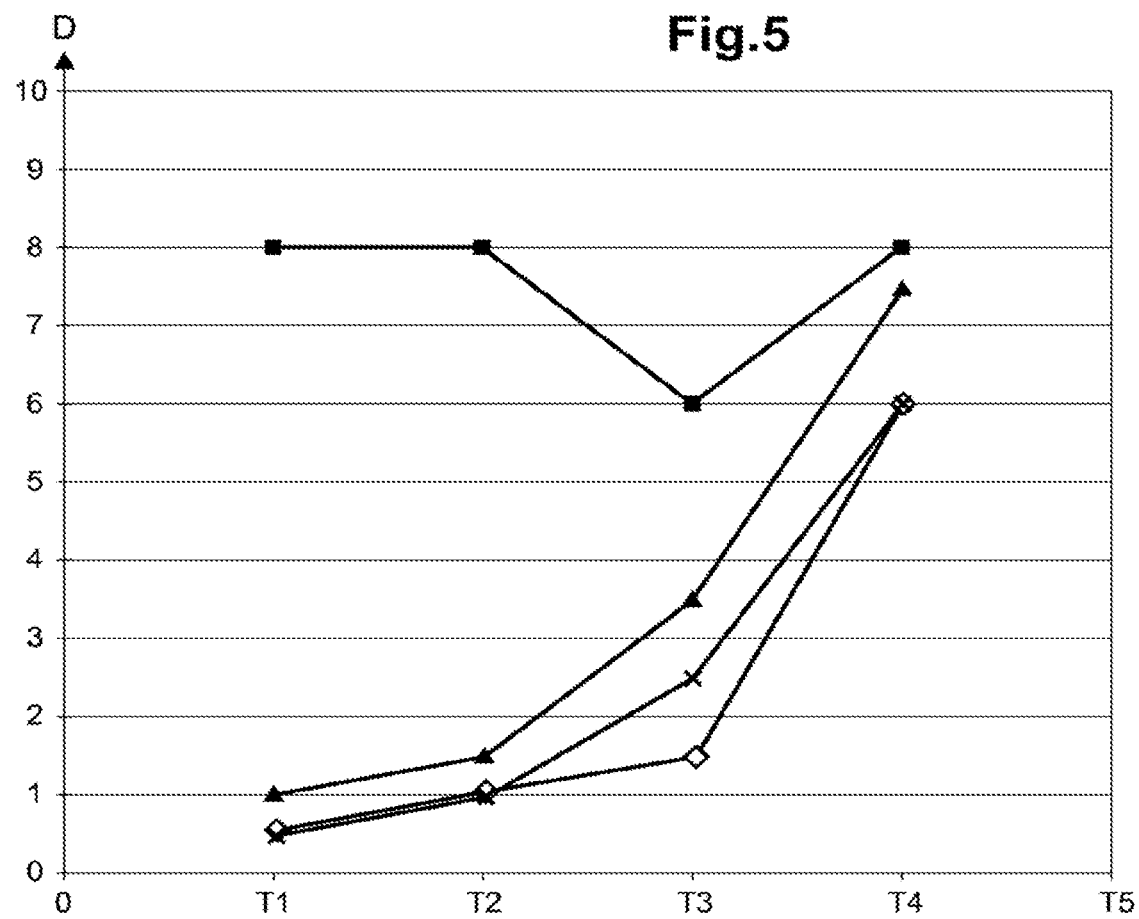

METHOD FOR DETERMINING A PROGRESSIVE OPHTHALMIC DEVICE FOR PERSONALISED VISUAL COMPENSATION FOR AN INDIVIDUAL

TECHNICAL FIELD TO WHICH THE INVENTION RELATES

The present invention generally relates to the field of items of visual-compensation progressive ophthalmic equipment.

It more particularly relates to a method for determining an item of personalized visual-compensation progressive ophthalmic equipment for an individual.

TECHNOLOGICAL BACKGROUND

A piece of visual-compensation progressive ophthalmic equipment typically includes a spectacle frame that accommodates two progressive ophthalmic lenses.

Progressive ophthalmic lenses allow the wearer to benefit from an optical power compensation that is suitable for various vision distances without changing spectacles. They may also correct other visual defects, such as for example astigmatism.

A progressive ophthalmic lens has a variable power over the surface of the lens.

Provision is for example made for a first vision zone for far vision having a first average power value, for a second vision zone for near vision having a second average power value and, between these two zones, for a third vision zone for intermediate vision, the curvature of which varies gradually and which is called the progression corridor.

The difference between the first and second average power values is equal to the power addition of the lens.

To meet as best as possible the visual needs of an individual, it is necessary to personalize each ophthalmic lens, in particular depending on the values of various parameters related to the wearer or to his item of equipment, comprising, for example, the defects of the vision of the individual to be compensated, the geometric characteristics of the chosen frame, and the characteristics of the visual behavior of the individual.

For example, the power addition of each lens depends on the visual compensation necessary for each eye of the wearer, in far vision and in near vision. The relative position of the far and near vision zones and the characteristics of the progression corridor depend, inter alia, on the geometric characteristics of the chosen spectacle frame and on the visual behavior of the individual, for example his propensity to move his eyes to a greater extent to look at an element of the environment in near or far vision.

At the present time, the values of these various parameters are measured at the moment of the production of the ophthalmic equipment and taken into account for this production. Specifically, regular changes in optician, the absence of prior measurements for the personalization of the ophthalmic lenses, or even the absence of storage of these prior measurements, prevent the precedingly measured values of these parameters from being taken into account.

Therefore, the precedingly measured values of these parameters, which values were for example taken during the production of prior items of ophthalmic equipment, are ignored during the production of the current item of ophthalmic equipment.

However, knowledge of old values measured for these parameters and, optionally, their comparison with the new measurements, may provide information that is relevant to better tailoring the new item of ophthalmic equipment to the wearer, this not being possible, or only possible with difficulty, in the current process of determining the item of ophthalmic equipment.

SUBJECT OF THE INVENTION

In order to remedy the aforementioned drawback of the prior art, the present invention proposes a method for determining an item of personalized visual-compensation progressive ophthalmic equipment for an individual wherein the value of at least one parameter measured before the appearance of the presbyopia of the individual is taken into account to determine the current item of visual-compensation equipment.

More particularly, according to the invention a method is proposed for determining an item of personalized visual-compensation progressive ophthalmic equipment for an individual, wherein the following steps are carried out:

a) in a data-acquiring first phase, at at least one first moment preceding the appearance of the presbyopia of this individual, at least one value of at least one individual parameter of said individual is determined, and each value of said individual parameter of the wearer is recorded in a database, in correspondence with an associated temporal indicator, b) in a second step of determining the item of personalized visual-compensation progressive ophthalmic equipment, a sought-after value of at least one geometric or optical parameter of said item of visual-compensation progressive ophthalmic equipment is determined while taking into account said at least one value, determined in step a), of said individual parameter and the associated temporal indicator.

The following are other advantageous and nonlimiting features of the method according to the invention, which may be implemented individually or in any technically possible combination:

in step a), a plurality of values of said individual parameter are determined, said plurality of values of said individual parameter comprising said value determined at said first moment preceding the appearance of the presbyopia of the individual, and at least one second and one third values of said individual parameter, which are determined at a second and a third moments that follow said first moment, and this plurality of values of said individual parameter of the wearer is recorded in said database, each in correspondence with the corresponding temporal indicator;

in step b), the sought-after value of the geometric parameter is determined while taking into account the temporal variation in said values of the plurality of values, determined in step a), of the individual parameter;

in step a), said first, second and third different moments are separated pairwise by at least twenty-four hours;

said first, second and third different moments are spaced apart in time by a minimal duration defined depending on the individual parameter in question;

in step a), a moment provided for the following determination of the value of the individual parameter is determined depending on the precedingly determined values of the individual parameter;

in a third step c), a personalized service in the ophthalmic field is further determined for the individual while taking into account at least the first, second and third determined values of said individual parameter and the associated temporal indicators;

in step a), at least one value of said plurality of values of said individual parameter is measured by a sensor integrated into a spectacle frame, and/or from one or more captured images and/or using a dedicated tool and/or using a questionnaire filled in by the individual;

in step a), at least one value of said plurality of values of said individual parameter, corresponding to a given moment, is estimated via a calculation dependent on prior values of this individual parameter determined before this given moment and on a model of the variation over time of this individual parameter;

in step a), another value of the individual parameter corresponding to said given moment is determined via a measurement and wherein said measured and estimated two values of this individual parameter are taken into account in step b) in order to determine the sought-after value of the geometric or optical parameter of said item of visual-compensation ophthalmic equipment;

in step a), a value of at least one control parameter relating to the individual is also determined and recorded in said database, in correspondence with said at least one value of the individual parameter and the corresponding temporal indicator, and, in step b), the importance of said at least one value of the individual parameter determined in step a) is weighted depending on the value of the associated control parameter;

a plurality of values of the individual parameter being determined in step a), in step b), the importance of each value, determined in step a), of said individual parameter is weighted depending on the variation over time in this control parameter;

said control parameter comprises a physiological parameter and/or a morphological parameter and/or a behavioral parameter and/or a neuro-cognitive parameter and/or a psychological parameter and/or an objective or subjective parameter relating to an item of ophthalmic equipment of the individual;

in step a), said individual parameter comprises a physiological parameter and/or a morphological parameter and/or a behavioral parameter and/or a neuro-cognitive parameter and/or a psychological parameter and/or an objective or subjective parameter relating to an item of ophthalmic equipment of the individual; and, in step b), said at least one geometric or optical parameter of the determined item of visual-compensation equipment comprises a geometric or optical parameter of an ophthalmic lens of the item of equipment and/or a geometric parameter of the frame of the item of equipment.

DETAILED DESCRIPTION OF ONE EXAMPLE EMBODIMENT

The following description, which is given with reference to the appended drawings, which are given by way of nonlimiting example, will allow what the invention consists of and how it may be carried out to be clearly understood.

Figure 2:
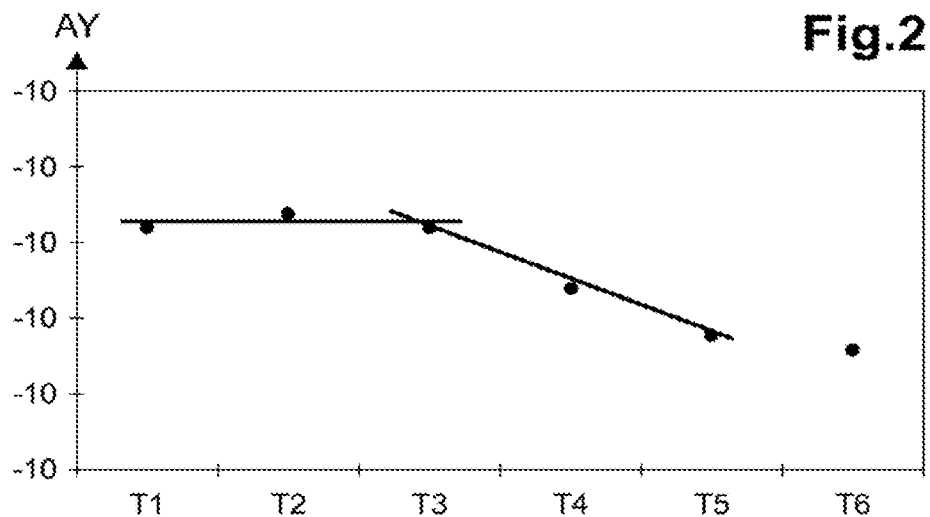
Figure 3:
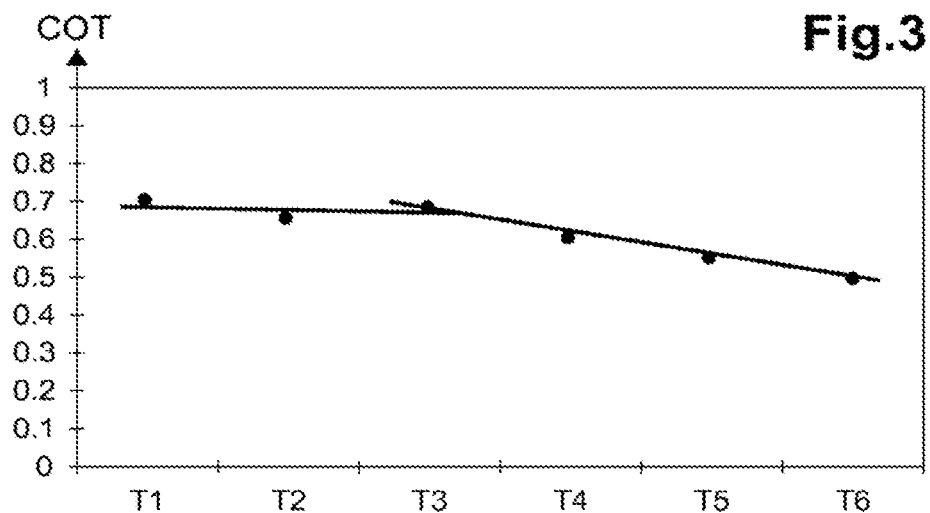

In the appended drawings:

FIG. 1 schematically shows the steps of acquiring measurements and of determining items of ophthalmic equipment over time, FIG. 2 is an example of a curve showing the variation over time of the value of the lowering angle AY in degrees of the eyes for an individual, FIG. 3 is an example of a curve showing the variation over time in the value of the eye-head coefficient COT of this individual, FIG. 4 is an example of a curve showing the variation over time in the value of the reading distance DL in centimeters for this individual, FIG. 5 is an example of a curve showing the variation over time in the hardness D (index comprised between 1 and 10) of an item of ophthalmic equipment produced for an individual (rhombus-shaped points), the associated assessment of this item of equipment by the individual evaluated thereby between 1 and 10 (square-shaped points), a model of the variation over time in the preferred hardness (of the item of equipment) statistically preferred by an individual (triangle-shaped points), and the variation over time in a theoretical ideal hardness for the item of equipment for this individual (cross-shaped points).

The method according to the invention permits data relating to an individual over time to be collected, stored and exploited so as to be able to provide him with an item of progressive ophthalmic equipment and optionally a service that meets as best as possible his visual needs.

In particular, the method according to the invention makes provision to collect data relating to the individual before the appearance of presbyopia, to store them and to use them at a subsequent moment, during the determination of an item of visual-compensation progressive ophthalmic equipment intended, inter alia, to compensate for the presbyopia of this individual at this subsequent moment.

More precisely, the method according to the invention allows an item of personalized visual-compensation progressive ophthalmic equipment to be determined for an individual via the following steps:

a) in a data-acquiring first phase, at least one first moment preceding the appearance of the presbyopia of this individual, at least one value of at least one individual parameter of said individual is determined, and this value of said individual parameter of the wearer is recorded in a database, in correspondence with an associated temporal indicator, b) in a second step of determining the item of personalized visual-compensation progressive ophthalmic equipment, a sought-after value of at least one geometric or optical parameter of said item of visual-compensation progressive ophthalmic equipment is determined while taking into account said at least one value, determined in step a), of the individual parameter and the associated temporal indicator.

This method may be implemented by virtue of a computational unit suitable for carrying out steps a) and b) or commanding said steps to be carried out.

FIG. 1 schematically shows these two steps: row 100 corresponds to step a), whereas row 200 corresponds to step b).

Row 100 schematically shows steps 110, 120, 130 of collecting data CIV(Ti) at various moments Ti.

Row 200 schematically shows two items of progressive ophthalmic equipment Ei, Ei+1 being produced at two moments Ti, Ti+1 corresponding to the blocks 210, 220 in the database of prior data at each of these moments.

Step a)

This step corresponds to the collection of the data of the individual.

This collection takes place at at least a first moment preceding the appearance of the presbyopia of this individual.

Presbyopia is a visual defect caused by a decrease in the elasticity of the crystalline lens occurring with age, which leads to a gradual decrease in the ability to accommodate:

near vision becomes increasingly hazy. Presbyopic individuals have a tendency to move the visual target away from their eyes so as to see it more clearly.

The first signs of presbyopia generally appear when the maximum accommodation becomes lower than 5 diopters.

The age of entry into presbyopia is on average comprised between 40 and 45 years.

The first moment Ti is therefore preferably located before the individual has reached the age of 40 years, preferably before the age of 35 years.

Said individual parameter comprises for example:
a physiological parameter such as for example a parameter relating to the refractive power and/or the acuity of each eye, the sensitivity to contrast of each eye, the ocular-motor coordination or the extra-foveal perception of the individual, and/or
a morphological parameter such as eye length, the size of the individual, pupil diameter or monocular pupillary distance, and/or
a behavioral parameter such as for example a parameter relating to the head-eye coefficient, to the lowering angle of the gaze, to reading distance, to gaze directions during a visual task, to posture during a visual task, to the zones of use of a lens worn or to the activities performed by the individual, and/or
a neuro-cognitive parameter such as performance in tracking multiple objects, the size of the attentional field, an embedded-figure test score, and/or
a psychological parameter such as the result in a personality test such as the NEO PI test, and/or
an objective or subjective parameter relating to an item of ophthalmic equipment of the individual, such as the characteristics of the item of ophthalmic equipment worn at the moment Ti, such as the hardness of the glass, or a parameter relating to the assessment of the item of equipment worn by the individual, such as an assessment of visual comfort.

Among the characteristics of the item of ophthalmic equipment worn at the moment Ti, the hardness of the ophthalmic lenses of this item of equipment is for example determined. The hardness parameter will be described in detail below.

The eye-head coefficient is a ratio between the angular extent of the movement of the eye and the angular extent of the movement of the head during a visual task involving looking at a visual target.

The zones of use of the lens correspond to the zones in which the points of intersection of the gaze directions and of the lens are located during a predetermined visual task.

The value of at least one of these parameters at the moment Ti of the determination is stored in a storage memory of the computational unit.

It is more precisely stored in a database, in correspondence with a temporal indicator.

This temporal indicator is representative of the moment Ti of the determination of the value of the individual parameter. This may be the corresponding value of the age of the individual for example, or even the date of the corresponding day.

The moment Ti may thus correspond to a given instant or to a given time interval, such as a day, a month or a given year.

The time interval corresponding to the moment Ti is for example comprised between an instant embodied by the time and date of the measurement, and a duration of six months. As a variant, the time interval corresponding to the moment Ti may be longer than or equal to six months, for example longer than two years, for example comprised between two and ten years.

In practice, the value of each individual parameter of a set of individual parameters Pi is preferably determined in step a).

The values of this set of individual parameters, which parameters are measured at the moment Ti, form a visual identity map (CIVi) of this individual at this moment Ti.

This visual identity map (CIVi) may comprise data and measurements that are:
point-like in nature and recorded at an instant of said moment Ti, such as the acuity of each eye, the sensitivity to contrast of each eye, the eye-head coefficient, the characteristics of the item of equipment worn, or
recorded over a given period dt of the moment Ti, for example the posture of the individual during a visual task, the one or more gaze directions during a visual task, the distance between the eyes of the individual and a target, the zones of use of a ophthalmic lens worn.

Each visual identity map CIVi thus includes the values Pi(Ti) at Ti of the individual parameters Pi.

All the visual identity maps together form the visual dossier of the individual.

Each value of one of said determined individual parameters in this visual dossier may be stored in a chip card or be stored for example on a specific cloud.

The visual dossier of the individual will possibly be updated once a new visual identity map CIV has been determined, i.e. once the value of at least one individual parameter is remeasured and/or once complementary parameters are measured at a subsequent instant.

The value of each individual parameter of the visual identity map may be determined in various ways, either directly by an operator responsible for the implementation of the method according to the invention, or by the individual himself. This determination is carried out either on-site, at an optician's, an ophthalmologist's or an optometrist's or remotely, at home for example or with a measuring instrument placed on the head of the individual.

This value may be determined when measurements are taken at an optician's, an ophthalmologist's or an optometrist's, using dedicated tools comprising various measuring apparatuses or various measuring methods. This is for example the case when the individual parameter relates to the acuity of each eye, to the sensitivity to contrast of each eye, to the eye-head coefficient, to posture during a given visual task, to the characteristics of the item of equipment worn, to the posture of the individual during a visual task, to the one or more gaze directions during a visual task, to the distance between the eyes of the individual and a target or even to the zones of use of an ophthalmic lens worn. The results of these determinations may be transmitted to the computational unit.

It may also be determined by virtue of the measurements carried out by one or more sensors integrated into a spectacle frame placed on the head of the individual, such as a gaze-tracking device, a rangefinder, or a sensor of inertial measurements.

These sensors preferably transmit their measurements to the computational unit.

This is in particular the case when the individual parameter relates to gaze directions, measured by virtue of the gaze-tracking device, and when the individual parameter relates to the distance between the eyes and a sighted point, such as reading distance for example, measured by virtue of the rangefinder.

It may also be determined via a remote test, carried out over the Internet, for example in the case of a measurement of the visual acuity of the individual. The individual may then for example carry out this test alone, using commonplace electronic, optical and computational tools and an interface that is accessible online. The result of this test is then transmitted to the computational unit.

This value may for example be determined from one or more images captured, either by the optician, the ophthalmologist or the optometrist, or by an image-capturing device integrated into the spectacle frame, or from a questionnaire that is filled in by the individual, in particular in order to collect the individual's assessment of his current item of ophthalmic equipment.

The visual identity map of the individual corresponding to a moment Ti may optionally contain the values of various individual parameters determined using various methods, in various locations, at various instants or various periods of the moment Ti.

In step a), a plurality of values of said individual parameter are preferably determined, said plurality of values of said individual parameter comprising, on the one hand, said value determined at said first moment preceding the appearance of the presbyopia of the individual, and, on the other hand, at least one second and, preferably, one third values of said individual parameter, which are determined at a second moment and a third moment that follow said first moment.

This plurality of values of said individual parameter of the wearer is recorded in said database, each in correspondence with the corresponding temporal indicator.

Again preferably, a plurality of values of each individual parameter of said set of individual parameters is preferably determined.

A plurality of visual identity maps CIV (Ti) of the individual, each corresponding to a different moment Ti, is then determined.

Preferably at least three values of each individual parameter are determined, i.e. three visual identity maps CIV(Ti) corresponding to three different moments.

The first, second and third moments are such that the second and third moments arrive in time chronologically after the first moment.

One of these three moments, for example the third moment, may correspond to the moment when the individual desires to acquire an item of visual-compensation progressive ophthalmic equipment, after the appearance of a presbyopic visual defect.

Said first, second and third different moments are for example separated pairwise by at least twenty-four hours.

In practice, said first, second and third different moments are separated from each other by a time interval longer than or equal to 24 hours.

These moments are for example separated by a time interval comprised between 24 hours and 10 years, for example equal to 24 hours, 48 hours, one week, one month, 6 months, one year, two years, three years, four years, five years, six years, seven years, eight years, nine years or ten years.

These moments may also be separated by a time interval longer than 10 years, for example comprised between 10 and 30 years.

These moments may in particular be separated from each other by different time intervals.

Preferably, said first, second and third different moments are spaced apart in time by a minimum duration defined depending on the individual parameter in question.

For example, the individual parameter relating to the visual acuity of the individual will be determined at moments separated by at least 6 months. For example, it may be determined at moments separated from each other by at least one year.

The individual parameter relating to the posture of the individual during a visual task will be determined at moments separated by at least 1 year.

The individual parameter relating to the reading distance of the individual will be determined at moments separated by at least 6 months.

The first, second and third moments may be predetermined.

The first, second and third moments may also be chosen by the individual among proposed predetermined time intervals.

The first, second and third moments may not be predetermined.

Provision may for example then be made to determine a moment intended for the following determination of the value of the individual parameter depending on the precedingly determined values of the individual parameter.

For example, a first value of the individual parameter having been determined at the first moment, the second moment for the determination of the second value of this individual parameter may be determined depending on said first value of this individual parameter. Next, the third moment for the determination of the third value of this individual parameter may be determined depending on said first and second values of this individual parameter. The computational unit may for example be programmed to this end.

The moment of the following determination of the value of the individual parameter may also be determined by the computational unit while taking into account a model of the variation over time in the value of this individual parameter. Such a model is for example a statistical model such as described in more detail below.

When such a model shows for example at a given moment that the value of the individual parameter in question should not have changed since the last determination, the computational unit is programmed to postpone the determination of the value of this individual parameter.

When such a model shows that, statistically, the value of the individual parameter in question should have changed significantly, for example by a threshold percentage comprised between 10 and 50% since the last determination, the computational unit is for example programmed to inform the individual that it would be useful to perform a new determination of this individual parameter.

As a variant, in step a), at least one value of said plurality of values of said individual parameter, corresponding to a given moment, is estimated via a calculation depending on prior values of this individual parameter, i.e. values determined before this given moment, and on a model of the variation over time in this individual parameter. The computational unit is programmed to this end.

Said value of the individual parameter is estimated depending on the prior values of this individual parameter, i.e. depending on the values of this individual parameter that were determined by measurement or by calculation before this given moment, and depending on said model of the variation over time in this individual parameter.

This given moment for which the value of the individual parameter is estimated by calculation may be a moment in the past, present or future with respect to the moment when this estimation is carried out.

The estimated value of the individual parameter may then allow:
- either the available data on the individual to be completed, for example a visual identity map determined beforehand and that does not include any value for this individual parameter to be completed,
- or the present value of this individual parameter to be determined in order to save one measurement,
- or the future value of this individual parameter to be forecast so as to predict how the vision and/or visual needs of the individual will change in the future.

In any case, this estimated value may be taken into account in step b) just like the other values of the individual parameter.

The model of the variation over time in this individual parameter is for example a statistical variation model. It may for example be a question of the variation with the age of the individual in the average values of the individual parameter, said variation being statistically determined for a given population of individuals. It is stored in the computational unit.

As yet another variant, at least one value of said plurality of values of said individual parameter, corresponding to a given moment, is estimated via a calculation as described above and another value of this individual parameter corresponding to the same given moment is determined via a measurement.

Preferably, then, each value of the individual parameter is associated with an indicator giving the estimated or measured nature of this value.

This indicator may be taken into account in step a), for the determinations of the subsequent values of the individual parameter, or in step b).

Said measured and estimated two values of this individual parameter are then taken into account in step b) in order to determine the sought-after value of the geometric or optical parameter of said item of vision-compensation ophthalmic equipment. This will be explained in more detail below.

According to yet another variant of the method according to the invention, in step a), a value of at least one control parameter relating to the individual is also determined and recorded in said database, in correspondence with said at least one value of the individual parameter and the corresponding temporal indicator, and this value of the control parameter is taken into account in step b) in order to determine the sought-after value of the geometric or optical parameter of said item of visual-compensation ophthalmic equipment. This will be explained in more detail below.

This control parameter may comprise a physiological parameter and/or a morphological parameter and/or a behavioral parameter and/or a neuro-cognitive parameter and/or a psychological parameter and/or an objective or subjective parameter relating to an item of ophthalmic equipment of the individual.

It is for example one of the individual parameters.

Furthermore, the list of the individual parameters the values of which are stored to form the visual identity map of the individual may be determined based on a predetermined list as a function of time, for example as a function of the age of the individual or as a function of the value of one of the individual parameters, for example the visual acuity or the refractive power of one eye.

Step b)

Step b) relates to the exploitation of the data collected in step a) so as to produce an item of personalized progressive ophthalmic equipment tailored to the needs of the individual.

To this end, the computational unit determines the sought-after value of the geometric or optical parameter of said item of visual-compensation progressive ophthalmic equipment, while taking into account said at least one value, determined in step a), of said individual parameter and the associated temporal indicator.

The geometric or optical parameter of the determined item of visual-compensation equipment comprises for example a geometric or optical parameter of an ophthalmic lens of the item of equipment and/or a geometric parameter of the frame of the item of equipment.

The optical parameter of the lens comprises any characteristic of the ophthalmic lens related to its effect on one or more light rays in transmission through this ophthalmic lens or in reflection from this ophthalmic lens.

In particular, this optical parameter may include the power of the ophthalmic lens or its astigmatism measured by lensmeter at one or more points, the power of this ophthalmic lens or its astigmatism under worn conditions (with the assembly consisting of the eye, lens and object environment) at one or more points or in one or more gaze directions, any other quantity calculable by ray tracing through the ophthalmic lens, for example optical aberrations, defocus, astigmatism, coma, or optical acuity, the transmittance through the lens, the reflectance from its surfaces, and any value calculated from this transmittance and/or reflectance, for example the maximum astigmatism or the maximum coma in a zone.

This optical parameter may moreover be deduced by calculating geometric characteristics of the ophthalmic lens.

The optical parameter of the ophthalmic lens may then comprise one or more of the following quantities:
- its power, or its astigmatism measured by lensmeter at one or more points,
- its power, its astigmatism or its resultant astigmatism, which is equal to the astigmatism of the lens minus the astigmatism of the individual, under worn conditions (with the assembly consisting of the eye, lens and object environment) at one or more points or in one or more gaze directions,
- its acuity in a gaze direction according to a model that takes both power and astigmatism as input,
- a coefficient of one of the polynomials (for example Zernike polynomials) obtained from decomposition of the wavefront through the ophthalmic lens,
- a prismatic deviation through the ophthalmic lens,
- an ocular deviation,
- any other quantity calculable by ray tracing through the ophthalmic lens,
- a maximum, a minimum, a variation or a gradient in the preceding quantities over a set of at least two points of a surface of the ophthalmic lens or for a set of at least two gaze directions of the individual,
- an optical or retinal flux through the ophthalmic lens,
- a position on the ophthalmic lens or the gaze direction of a particular vision zone, i.e. a location in which the power and/or the astigmatism of the ophthalmic lens corresponds to the refractive power of the wearer in far vision or in near vision or to a particular value,
- a progression length from x % to y % on the ophthalmic lens or in gaze direction, i.e. the vertical distance between a position on the lens or a gaze direction for which the power is equal to the refractive power for far vision+x %*Add and another position or gaze direction for which the power is equal to the refractive power for far vision+y %*Add, where Add is the addition of the lens, an inset, i.e. a horizontal distance between two positions on the ophthalmic lens corresponding to two powers or astigmatisms, for example, the inset between the points of the lens corresponding to near vision and far vision, which is the horizontal distance between the position corresponding to the refractive power for far vision and the position corresponding to the refractive power for near vision, a horizontal extent (also called width) or vertical extent (also called height) of a vision zone on the lens or in gaze direction, i.e. a distance between two positions or two gaze directions located at a given height or at a given lateral off-centeredness, respectively, and between which the power and/or the resultant astigmatism are comprised between two thresholds or lower than a threshold, a height of a vision zone on the ophthalmic lens or in gaze direction, i.e. a distance between two positions or gaze directions located at a given lateral off-centeredness and between which the variation in the power of the ophthalmic lens is lower than a threshold value, for example lower than 0.25 diopters, a transmittance through the ophthalmic lens in a given vector direction, a reflectance from one of the surfaces of the ophthalmic lens at one or more given angles of incidence.

The geometric parameter of the lens comprises any characteristic related to the geometry of the lens, this possibly therefore including its thickness at its optical or geometric center, its thickness along its peripheral edge, optionally its thickness at any point, its weight, the geometry of one of its surfaces (front or back surface for example), the curvature or base at one or more points of one of its surfaces, the kinematics between the surfaces of the lens, the index of the material of the lens, the nature of the stacked varnishes of the thin layers forming its antireflection coating and other types of treatments of the surfaces.

The geometric parameter of the ophthalmic lens may then comprise one or more of the following quantities:

its thickness at the center,
its thickness at the edge,
optionally its thickness at any point,
its weight,
the geometry of one of its surfaces (front or back surface for example),
the curvature or base of one or more points of one of the surfaces,
the kinematics, i.e. the horizontal and vertical prisms between the surfaces of the ophthalmic lens,
the index of the lens,
the nature of the stacked varnishes of the thin layers forming its antireflection coating and other types of treatments of the surfaces,
the position of a tracing point on one of the surfaces of the lens or of a point at which its power is measured, with respect to the prism reference point or to the center of the micro-circles,
the horizontal or vertical distance between two tracing/measurement points, for example the progression length, i.e. the vertical distance between far-vision (FV) point and near-vision (NV) point, and the inset, i.e. the horizontal distance between FV point and NV point.

In particular, the geometric or optical parameter of the lens may relate to the refractive power of each progressive ophthalmic lens, to the addition, to the position of the near- and/or far-vision zones on the edged lens, to the progression length, i.e. the length of the progression corridor of each lens, to the inset of each lens or to the hardness of the ophthalmic lens.

The fitting cross is a reference point for positioning the lens in front of the eye of a wearer the position of which is predefined by the manufacturer of the lens.

The zone for far vision and the zone for near vision are separated by a distance called progression length.

Progression length may be defined as the vertical distance between the fitting cross and the position of the near-vision reference point defined by the manufacturer of the lens.

The horizontal and vertical directions of the lens are defined depending on the position of the lens under the conditions of use by the wearer, in the chosen frame.

The progression length of the lens must be adjusted depending on the mounting height of the ophthalmic lens.

The mounting height of the ophthalmic lens corresponds to the height, with respect to the lower edge of the rim of the frame, of the projection of the pupil of the wearer having a predetermined primary gaze direction on a mean plane of this rim of the chosen frame, corresponding to a mean plane of the ophthalmic lens once fitted in said frame.

The geometric parameter of the frame may relate to the dimensions of the rims of the frame, in particular their width A or their height B, to the width of the bridge D, to the total width of the frame front, to the position of the boxing-system center with respect to the position of the pupil, to the wrap of the frame, to the pantoscopic angle and the shape/size of the lens outline or of the rim of the frame.

The determination of this geometric or optical parameter may take into account a predetermined criterion. This criterion may for example be a criterion of comfort of the individual, requiring that the new item of progressive ophthalmic equipment determined by the method according to the invention modifies as little as possible the perception, the behavior, the comfort, and the visual habits of the wearer at one of said moments of determination of the value of the individual parameters (see for example example 5).

Preferably, in step b), the sought-after value of the geometric parameter is determined while taking into account said plurality of values of the individual parameter, namely at least two of the three values, determined at the first, second and third moments, of the individual parameter, and preferably all three of the values, determined at the first, second and third moments, of the individual parameter.

In other words, in step b), the sought-after value of the geometric parameter is determined while taking into account at least one value, determined before the appearance of the presbyopia, of the individual parameter, and at least one subsequently determined value of the individual parameter, i.e. at least one value determined after this first determination.

Provision may also be made for at least one value, determined after the appearance of the presbyopia, of the individual parameter to be taken into account in step b).

In particular, the temporal variation of said values of the plurality of values, determined in step a), of the individual parameter is taken into account to determine the geometric or optical parameter in step b). This temporal variation is determined for each individual parameter, and corresponds to a variation function Fevol(Pi).

Specifically, knowledge of the variation in visual-behavior data and of the variation in the refraction, in the presbyopia and/or in the items of progressive ophthalmic equipment worn beforehand and the assessment thereof by the individual, give precious information on the variation in the needs of the individual that may be used to personalize his new item of progressive ophthalmic equipment.

Furthermore, for each individual parameter Pi, a weighting factor Fpond(Pi(Ti)) may be determined for each value determined at a moment Ti.

Preferably, the item of progressive ophthalmic equipment Ei is then determined depending on the values, determined at the various moments Ti, of the individual parameters, for example for N moments, i=1 to N, on the corresponding weighting factors Fpond (Pi(Ti)), for i=1 to N, and on the corresponding temporal variation Fevol(Pi), for i=1 to N, in this individual parameter.

Preferably, when the value of a control parameter has been recorded in step a) in correspondence with each value of the individual parameter, in step b), the computational unit is programmed to weight the importance of said at least one value, determined in step a), of the individual parameter depending on the associated value of the control parameter.

In particular, in step b), the computational unit may be programmed to weight the importance of each value, determined in step a), of said individual parameter depending on the variation over time in this control parameter.

Specifically, it would for example not be relevant to take into account an eye-head coefficient recorded when the individual was 25 years old to optimize his ophthalmic lenses 20 years later if said individual has since lost dynamism/mobility because of an accident or ageing.

Thus, for example, if a control parameter relating to the dynamism and/or mobility of the individual is recorded at each moment of determination, and if its variation shows a decrease in dynamism and/or mobility, the weights of the parameters related to vision in movement taken into account in the determination of the geometric or optical parameter of the sought-after item of progressive ophthalmic equipment are decreased with respect to the weights of the other individual parameters, so as to decrease their influence in the determination of the sought-after geometric or optical parameter.

According to another example, the individual parameter relates to the visual acuity, i.e. to a visual performance, of the individual. The control parameter may be an activity indicator that modulates upward or downward the importance of this parameter and thus may thus permit other variants of the design of the lens in order for example to promote the adaptation of the individual.

Optionally, provision may be made for the individual to be able to have access to his recorded data and to their variation over time, to be able to view them via a website or an application, and to compare his data with the averages of other individuals.

It is possible to envision the individual having access to models of the variation in the individual parameters in order to assist him with understanding the variation therein. This could encourage him to review his assessment of his current item of equipment.

Furthermore, by virtue of the method according to the invention, it is also possible to provide a service in the ophthalmic field that is tailored to the individual, in particular by planning actions in relation to the "visual health" of the individual. The latter points are achieved by virtue of a prediction of the variation in the vision of the individual.

It is then a question of estimating, as mentioned above, the value of the one or more individual parameters for a future moment Ti. Depending on this estimated future value, a modification of the item of progressive ophthalmic equipment or a new determination of the individual parameters may be determined. The individual is informed thereof.

For example, the individual may then consult, in his personal space, recommendations regarding a visit to an optician or an ophthalmologist, and propositions of a new item of equipment or a more appropriate item of equipment, with explanations of the differences between items of equipment tailored to his data.

Various examples of implementation will now be described in order to illustrate the invention. These examples are nonlimiting.

EXAMPLE 1

Each individual has a natural visual behavior that is specific thereto. The appearance of presbyopia will gradually disrupt this natural visual behavior, making the determination of this natural visual behavior after the appearance of presbyopia impossible.

Thus, it is important to know this natural visual behavior in order to be able to select or personalize the item of progressive ophthalmic equipment of the individual as well as possible.

In this example, each visual identity map includes the values at the moment of their determination of the following individual parameters:
lowering angle of the gaze, i.e. angle between the gaze direction through the lens and a reference gaze direction corresponding to the primary gaze direction of the individual when he is looking straight ahead to infinity, through the fitting cross and therefore with a progressive lens,
eye-head coefficient,
reading distance.

The values of these three individual parameters are measured every 4 years from the 25th birthday of the individual, this here corresponding to the first moment T1.

The presbyopia of the individual here starts to manifest itself at the age of 37 years at the moment T4.

Three visual identity maps were therefore determined, at T1, T2, and T3, before the appearance of the presbyopia and two visual identity maps were determined, at T5 and T6, after the appearance of the presbyopia.

The results of these measurements are shown in the following table 1, in correspondence with the temporal indicator that here is the age of the individual at each moment Ti.

These results allow the temporal variation of each individual parameter to be determined. This variation is shown graphically in the graphs of FIGS. 2, 3 and 4.

The temporal variation in each of these three individual parameters provides evidence of two phases in the life of the individual.

TABLE 1

|  | T1 | T2 | T3 | T4 | T5 | T6 |
| --- | --- | --- | --- | --- | --- | --- |
| Age | 25 | 29 | 33 | 37 | 41 | 45 |
| Eye lowering AY (°) | −19 | −18 | −19 | −23 | −26 | −27 |

TABLE 1-continued

|  | T1 | T2 | T3 | T4 | T5 | T6 |
|---|---|---|---|---|---|---|
| Eye-Head Coeff COT | 0.7 | 0.65 | 0.68 | 0.6 | 0.55 | 0.5 |
| Reading distance DL (cm) | 35 | 37 | 36 | 40 | 44 | 45 |
| CIV | CIV(T1) | CIV(T2) | CIV(T3) | CIV(T4) | CIV(T5) | CIV(T6) |

In a first phase, the behavior of the individual, characterized by the lowering of his gaze, the eye-head coefficient and the reading distance, is quite stable: the values of these three parameters vary little over time (see FIGS. 2, 3 and 4). This first phase corresponds to the measurements of the moments T1, T2 and T3.

In a second phase, a variation in the behavior of the individual is observed. This second phase corresponds to the measurements carried out at moments T4, T5 and T6. This second phase corresponds to the installation of the visual defect of presbyopia. The temporal variation in the behavior of the individual shows an increase, in absolute value, in the lowering angle of the gaze, a slight decrease in the eye-head coefficient and a marked increase in reading distance.

The values of the individual parameters collected at the moments T1, T2 and T3 may be considered to be reference values representative of the natural behavior of the individual before the onset of the presbyopia.

The first item of progressive ophthalmic equipment is here produced at the moment T6.

By virtue of the method according to the invention, to determine the geometric and/or optical parameters of the item of progressive ophthalmic equipment at the moment T6, the values of these individual parameters determined prior to the moment T6 are taken into account.

The values of the individual parameters relating to gaze lowering and to reading distance at the instants T1, T2 and T3 are used to adjust the near-vision zone of the progressive ophthalmic lens: addition, progression length, insets, etc. so as to guarantee the individual a comfortable posture with his progressive lenses close to the comfortable posture of the individual before the onset of the presbyopia.

In contrast, the observed variation in the eye-head coefficient is not related to the deficit in clearness of near vision engendered by the presbyopia but more probably to an age-related change.

The choice of the hardness of the ophthalmic lens will therefore be made on the basis of a combination of the measurements performed from T1 to T6 corresponding for example to the average of the measurements from T1 to T6.

EXAMPLE 2

In this second example, a presbyopic individual desires to have an item of optical-compensation progressive ophthalmic equipment produced at the present moment T4. To this end, a visual identity map CIV including the values of the following individual parameters:
  refraction of each eye: spherical power SPHi, cylindrical power, orientation of the axis of the cylinder, addition ADDi,
  characteristics of the item of progressive ophthalmic equipment Ei worn by the individual at Ti: power in near and far vision and hardness,
  assessment by the individual of his item of ophthalmic equipment at Ti for the period [Ti–1, Ti].

The hardness of an ophthalmic lens is a value representative of the compromise made between the desirable increase in the field of vision of the individual through the ophthalmic lens, and therefore an increase in the dimensions of the near- and/or far-vision zones, and the limitation of the effects of peripheral distortion related to the optical aberrations of the ophthalmic lens.

A high hardness thus indicates a large field of vision but more sizeable effects of peripheral distortion of the image seen through the lens than with a low hardness, which indicates a smaller field of vision, but less sizeable peripheral distortion effects.

Here, the hardness of the lens is determined depending on the power gradient of this lens, which is compared to the power gradients determined for the lenses of a preestablished database. A hardness of 10 is attributed to the lens having the highest power gradient of the database and a hardness of 0 is attributed to the lens having the lowest gradient.

A plurality of visual identity maps CIV of this individual, each including the values of all these individual parameters were recorded at moments T1, T2 and T3 prior to the moment T4.

Table 2 gives the main data of these visual identity maps.

TABLE 2

| CIV(Ti) | Ti | SPHi | ADDi | Hardness (0-10) | Assessment (between 0 and 10) |
|---|---|---|---|---|---|
| CIV(T1) | T1 | −4 | 0.75 | 0.5 | 8 |
| CIV(T2) | T2 | −4 | 1.25 | 1 | 8 |
| CIV(T3) | T3 | −4 | 1.75 | 1.5 | 6 |
| CIV(T4) | T4 | −4 | 2.5 | to be determined | to be determined |

Up to the moment T4, the individual was equipped with an item of progressive ophthalmic equipment of a given type, tailored each time to his refraction. At each moment Ti, the item of equipment of the individual comprises a progressive ophthalmic lens the hardness of which is indicated in table 2.

The assessment of this item of equipment, given by a score out of 10 indicated by the individual was good at the moments T1 and T2, with a score of 8/10.

At the moment T3, the individual is less satisfied with his item of equipment E3 because his assessment indicates a score of only 6/10.

A model representing the average hardness preferred by presbyopic wearers of visual-compensation progressive ophthalmic equipment as a function of their age is then used.

This model is statistically determined by collecting the assessments of the users of their equipment.

According to this model, individuals who have been presbyopic for a short time, i.e. for example those whose item of equipment has an addition lower than or equal to 1.5 diopters, prefer items of equipment equipped with progressive lenses the hardness of which is low and individuals who have been presbyopic for longer prefer progressive lenses the hardness of which is higher.

In other words, the hardness preferred by an individual for his progressive ophthalmic lenses decreases with the recentness of the presbyopia of this individual.

Table 3 gives the statistical values of the hardness preferred at the corresponding moment Ti of table 2.

TABLE 3

| Ti | Hardness (0-10) | Average preferred hardness (0-10) | Ideal theoretical hardness (0-10) |
| --- | --- | --- | --- |
| T1 | 0.5 | 1 | 0.5 |
| T2 | 1 | 1.5 | 1 |
| T3 | 1.5 | 3.5 | 2.5 |
| T4 | to be determined | 7.5 | 6 |

Specifically it will be noted that the assessment of the individual was good when the hardness of his item of equipment was close to the average preferred hardness, as is the case at the moments T1 and T2, but that his assessment deteriorates when the hardness of the item of equipment of the individual gets further from this average preferred value (case at the moment T3).

Then, by virtue of the method according to the invention, the computational unit is programmed to determine the optical characteristic of hardness of the item of ophthalmic equipment E4 depending on the values at the moment T4 of the refraction parameters of the individual and on the value of the model of average preferred hardness at the moment T4.

More precisely, to this end, the computational unit is programmed to estimate, at each moment Ti, a theoretical value of the ideal hardness of the lens of the item of ophthalmic equipment Ei of the individual.

This estimated value of the hardness takes into account the hardness values of the determined items of equipment Ei and the assessment thereof, and the model of preferred hardness.

The estimated value of the ideal hardness for the time T4 is then applied to the new item of ophthalmic equipment E4 determined at the moment T4.

The item of equipment E4 is then tailored to the current values at the moment T4 of the refraction of the individual and takes into account the variation in his needs, preferably over time.

This variation is schematically shown in FIG. 5, in which the variation over time in the hardness of the item of ophthalmic equipment Ei produced for an individual (rhombus-shaped points), in the assessment associated with this item of equipment Ei by the individual, evaluated by the latter between 1 and 10 (square-shaped points), in the model of the variation over time in the hardness statistically preferred by an individual (triangle-shape points), and in the hardness of the item of equipment that is estimated to be ideal for this individual (cross-shaped points) have been shown.

The preferred hardness is the curve to be followed on average.

It will be noted in this example that the individual is very satisfied with his item of equipment at the moments T1 and T2 since the assessment associated with the items of equipment at these moments has a score of 8 out of 10.

The hardness of the item of equipment worn by the individual at the moments T1 and T2 follows the curve of preferred hardness.

At the moment T3, the hardness of the item of equipment worn diverges from the preferred hardness and the satisfaction of the individual decreases, since his assessment of the item of equipment is represented by a score of 6 out of 10.

For the moments T3 and T4, the curve of estimated ideal hardness was constructed for this wearer (cross-shaped points) based on the hardnesses assessed at the moments T1 and T2, this curve following a variation similar to the curve of the model of preferred hardness (triangle-shaped points), i.e. a variation substantially parallel to this curve of preferred hardness, passing through the hardnesses of the item of equipment worn at T1 and T2.

A theoretical ideal hardness of the item of equipment at the moment T3 (which differs from the hardness of the item of equipment actually worn at the moment T3) and a theoretical ideal hardness for the item of equipment at the moment T4 (rhombus-shaped point) equal to 6 are thus determined. The latter value is adopted for the new item of equipment produced at the moment T4 (cross-shaped point at T4).

Since the hardness of the item of equipment E4 is close to the preferred hardness at the moment T4, the expected assessment of the item of equipment E4 should be good. It is for example 8/10.

EXAMPLE 3

In this example 3, the value of at least one control parameter is determined in each determination of a visual identity map.

In practice, it is here a question of a plurality of control parameters. They for example relate to the activities of this individual. It is for example a question of parameters relating to the frequency with which certain sports are practiced, to the frequency with which an automobile is driven, with which outside activities are practiced, etc.

The activities practiced by the individual change throughout his life, because his lifestyle and his needs change but also because certain activities can no longer be practiced or because their practice is modified toward a less active version.

In this case, this type of information is crucial to take into account because it weights the importance and the weight of one or more individual parameters.

In the case of an individual who has a plurality of visual identity maps recorded in his visual dossier, said maps are taken into account every time an item of progressive ophthalmic equipment is produced.

At the present moment Ti of determination of a new visual identity map CIV(Ti), this individual has an advanced age and can no longer drive his vehicle, limits his movements and thus passes more time on static activities.

Each visual identity map here comprises the complete refraction values of the individual: cylindrical and spherical power, orientation of the axis of the cylinder and addition at Ti, the characteristics of the item of ophthalmic equipment Ei worn, in particular its hardness, and a measurement of the eye-head coefficient COTi of the individual at the moment Ti.

The eye-head coefficient COTi of the individual is stable between T1 and T4. Just retired he has gradually begun to practice sporting activities again, and hence a change in eye-head coefficient observed at the moment T5.

Table 4 summarizes the data collected for this individual.

TABLE 4

| CIV(Ti) | Ti | SPHi | ADDi | COTi | Hardness associated with the COT Dcot | Average preferred hardness Dage | Average ($D_{cot}$, $D_{age}$) | Final hardness of item Ei |
|---|---|---|---|---|---|---|---|---|
| CIV(T1) | T1 | −3 | 0.75 | 0.18 | 8.2 | 0.5 | 4.4 | 4.4 |
| CIV(T2) | T2 | −3 | 1.25 | 0.24 | 7.6 | 1 | 4.3 | 4.3 |
| CIV(T3) | T3 | −3 | 1.75 | 0.2 | 8 | 2.5 | 5.3 | 5.3 |
| CIV(T4) | T4 | −3 | 2.00 | 0.23 | 7.7 | 3.5 | 5.6 | 5.6 |
| CIV(T5) | T5 | −3 | 2.25 | 0.62 | 3.8 | 4.5 | 4.2 | to be determined |

It is then less important to take into account individual parameters obtained from preceding identity maps having a link with vision in movement insofar as they are no longer representative of the future of this wearer.

Thus, individual parameters such as the eye-head coefficient, vision in movement, extra-foveal perception, and ocular-motor coordination become less important or, indeed, are not taken into account at all.

Their influence and thus their weight in the choice of an item of equipment becomes small or even inexistent.

In contrast, the weight of individual parameters relating to near vision, such as gaze lowering, perceived fields, reading distance, intermediate vision, and static (reading) posture is increased.

Thus, the variation over time in control parameters relating to the activity of the individual, or one or more values, determined at the present moment or at a preceding moment, of these control parameters, allow the weight of each individual parameter in the determination of the optical and/or geometric parameter of the present item of ophthalmic equipment to be determined.

Weighting factors of each individual parameter are determined depending on this variation over time and/or these values.

EXAMPLE 4

In this example, a presbyopic individual benefits from having recorded a plurality of visual identity maps at past moments T1, T2, T3 and T4.

At the present moment T5, a new visual identity map is recorded.

For each moment Ti, with each measured eye-head coefficient COTi is associated a hardness associated with the eye-head coefficient Dcot(Ti), said hardness being determined using a model dependent on eye-head coefficient. This model is determined statistically by collecting the assessments of a sample of users having COTs covering the interval of values between 0 and 1 and each having compared items of equipment of different hardnesses.

The preferred hardness Dage(Ti) of the item of equipment Ei for an individual of given age is estimated as mentioned above on the basis of an age-related hardness model. This model is determined statistically by collecting the assessments of a sample of users aged between 25 and 80 each of said users having compared items of equipment of different hardnesses.

The combination of these two estimated hardness values allows the hardness of the lens to be provided to the individual for an optimal vision comfort to be determined.

Here, this combination is carried out by the calculation of the average of these two estimated hardness values.

This calculation was carried out at the moments T1, T2 and T3 to produce the items of equipment E1, E2 and E3.

At the moments T3 and T4, by virtue of the set of measured values of the individual parameters and of the model of average preferred hardness as a function of age, it is also possible to predict the hardness that will be optimal for the individual at the moments T4 and T5, respectively.

These predicted values are calculated by determining a first average of the hardness values associated with the eye-head coefficient of the preceding visual identity maps, then by determining a second average of this first average with the average preferred hardness value at the age corresponding to the present moment T4 or T5.

Namely here:

Optimal hardness predicted for $E4Dpredite(T4)$= $((8.2+7.6+8)/3+3.5)/2=5.7$ and Optimal hardness predicted for $E5Dpredite(T5)$= $((8.2+7.6+8+7.7)/4+4.5)/2=6.2$.

These values are indicated in the last column of table 5 below, which partially reproduces the data of table 4.

TABLE 5

| CIV(Ti) | Ti | Hardness associated with the COT Dcot | Average preferred hardness Dage | Average ($D_{cot}$, $D_{age}$) | Final hardness of item Ei | Predicted optimal hardness for Ei Dpredite |
|---|---|---|---|---|---|---|
| CIV(T1) | T1 | 8.2 | 0.5 | 4.4 | 4.4 | — |
| CIV(T2) | T2 | 7.6 | 1 | 4.3 | 4.3 | — |
| CIV(T3) | T3 | 8 | 2.5 | 5.3 | 5.3 | — |
| CIV(T4) | T4 | 7.7 | 3.5 | 5.6 | 5.6 | 5.7 |
| CIV(T5) | T5 | 3.8 | 4.5 | 4.2 | to be determined | 6.2 |

At the moment T4, the value of the final hardness of the item of equipment, which value was set equal to the average (5.6) of the age-dependent preferred hardness and the hardness associated with the eye-head coefficient, was very close to the value of the predicted optimal hardness (5.7). An item of equipment having a hardness equal to 5.6 was chosen for the individual.

At the moment T5, the average (4.2) of the age-dependent preferred hardness and of the hardness associated with the eye-head coefficient is far from the predicted value of 6.2.

In this case, to avoid an excessively abrupt change in the hardness of the item of equipment, ophthalmic lenses of hardness intermediate between these two values are chosen: a hardness equal to 5.2 is determined.

More precisely, the function used to determine the hardness of the final ophthalmic lenses of the item of equipment Ei may here be written:

$D(Ti)$=Average($Dage(Ti),D$ cot($Ti$)) if |$D$predite($Ti$)−Average ($Dage(Ti),D$ cot($Ti$))|<1 and $D(Ti)$=Average($Dage(Ti),D$ cot($Ti$),$D$predite($Ti$)) if |$D$predite($Ti$)−Average($Dage(Ti),D$ cot($Ti$))|> or equal 1.

Thus, if the difference between the hardness value predicted at the moment Ti and the average of the age-dependent preferred hardness and the hardness associated with the eye-head coefficient is lower than 1, the value of the average of the age-dependent preferred hardness and of the hardness associated with the eye-head coefficient is adopted for the final hardness of the item of equipment Ei.

If the difference between the hardness value predicted at the moment Ti and the average of the age-dependent preferred hardness and the hardness associated with the eye-head coefficient is higher than or equal to 1, the final hardness of the item of equipment Ei is set equal to the average of the age-dependent preferred hardness, of the hardness associated with the eye-head coefficient and of the predicted hardness, in order to take into account this predicted value.

This choice takes into account the variation in the needs of the individual over time (change of eye-head coefficient due to a change in lifestyle) while avoiding an excessively abrupt change in hardness, in order to facilitate his adaptation to the new item of equipment.

EXAMPLE 5

Before the presbyopia, the individual wore a small frame, i.e. a frame the width, height and front width of which were smaller than corresponding threshold values. He is therefore used to a small size of field of vision.

With the onset of presbyopia, it is preferable to not too greatly modify his size of field of vision.

Thus, in step b), the dimensions of the new frame of the individual are determined so that this new frame is just large enough to be able to accommodate progressive lenses tailored to the vision of the individual, and remain as close as possible to the dimensions of the old frame.

The invention claimed is:

1. A method for determining an item of personalized visual-compensation progressive ophthalmic equipment for an individual, the method comprising:
   a) in a data-acquiring first phase, determining a plurality of values of at least one individual parameter, the plurality of values of the individual parameter comprising at least one value determined at at least one first moment preceding an appearance of presbyopia of the individual, and at least one second and one third values of the individual parameter, which are determined at a second and a third moments that follow the first moment, recording each value of the plurality of values of the individual parameter of the individual in a database, in correspondence with an associated temporal indicator, and estimating at least one value of the plurality of values of the individual parameter, corresponding to a given moment, via a calculation dependent on prior values of the individual parameter determined before the given moment and on a model of a variation over time of the individual parameter; and
   b) in a second step of determining the item of personalized visual-compensation progressive ophthalmic equipment, determining a value of at least one geometric or optical parameter of the item of visual-compensation progressive ophthalmic equipment while taking into account the at least one value, determined in step a), of the individual parameter and the associated temporal indicator.

2. The method as claimed in claim 1, wherein, in step b), the value of the geometric parameter is determined while taking into account a temporal variation in said values of the plurality of values, determined in step a), of the individual parameter.

3. The method as claimed in claim 1, wherein, in step a), said first, second and third different moments are separated pairwise by at least twenty-four hours.

4. The method as claimed in claim 1, wherein said first, second and third different moments are spaced apart in time by a minimal duration which depends on the individual parameter.

5. The method as claimed in claim 1, wherein, in step a), the second moment and/or the third moment provided for the following determination of the value of the individual parameter is determined depending on precedingly determined values of the individual parameter.

6. The method as claimed in claim 1, wherein, in step a), measuring at least one value of said plurality of values of said individual parameter by a sensor integrated into a spectacle frame, and/or from one or more captured images and/or using a dedicated tool and/or using a questionnaire filled in by the individual.

7. The method as claimed in claim 1, wherein, in step a), determining another value of the individual parameter corresponding to said given moment via a measurement and wherein said measured and estimated two values of the individual parameter are taken into account in step b) in order to determine the value of the geometric or optical parameter of said item of visual-compensation ophthalmic equipment.

8. The method as claimed in claim 1, wherein,
   in step a), determining and recording a value of at least one control parameter relating to the individual and in said database, in correspondence with said at least one value of the individual parameter and the corresponding temporal indicator, and
   in step b), weighting an importance of said at least one value of the individual parameter determined in step a) depending on the value of the associated control parameter.

9. A method for determining an item of personalized visual-compensation progressive ophthalmic equipment for an individual the method comprising:
   a) in a data-acquiring first phase, at at least one first moment preceding an appearance of presbyopia of the individual, determining at least one value of at least one individual parameter of the individual, and recording each value of the plurality of values of the individual parameter of the individual in a database, in correspondence with an associated temporal indicator; and
   b) in a second step of determining the item of personalized visual-compensation progressive ophthalmic equipment, determining a value of at least one geometric or optical parameter of the item of visual-compensation progressive ophthalmic equipment while taking into account the at least one value, determined in step a), of the individual parameter and the associated temporal indicator, wherein
   in step a), determining and recording a value of at least one control parameter relating to the individual and in the database, in correspondence with the at least one value of the individual parameter and the corresponding temporal indicator,
   in step b), weighting an importance of the at least one value of the individual parameter determined in step a) depending on the value of the associated control parameter,
   in step a), determining a plurality of values of the individual parameter, and
   in step b), an importance of each value, determined in step a), of the individual parameter is weighted depending on a variation over time in the control parameter.

10. The method as claimed in claim 8, wherein, said control parameter comprises a physiological parameter and/or a morphological parameter and/or a behavioral parameter and/or a neuro-cognitive parameter and/or a psychological parameter and/or an objective or subjective parameter relating to an item of ophthalmic equipment of the individual.

11. The method as claimed in claim 1, wherein, in step a), said individual parameter comprises a physiological parameter and/or a morphological parameter and/or a behavioral parameter and/or a neuro-cognitive parameter and/or a psychological parameter and/or an objective or subjective parameter relating to an item of ophthalmic equipment of the individual.

12. The method as claimed in claim 1, wherein, in step b), said at least one geometric or optical parameter of the determined item of visual-compensation equipment comprises a geometric or optical parameter of an ophthalmic lens of the item of equipment and/or a geometric parameter of a frame of the item of equipment.

13. The method as claimed in claim 8, wherein,
   in step a), determining a plurality of values of the individual parameter, and
   in step b), an importance of each value, determined in step a), of the individual parameter is weighted depending on a variation over time in the control parameter.

* * * * *